US007749065B1

(12) United States Patent
Englman

(10) Patent No.: US 7,749,065 B1
(45) Date of Patent: Jul. 6, 2010

(54) SLOT-KENO VIDEO GAMING MACHINE

(75) Inventor: Allon G. Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1404 days.

(21) Appl. No.: 11/174,237

(22) Filed: Jul. 1, 2005

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .................... 463/17; 273/121 A; 273/139; 273/144 B; 273/292; 463/16; 463/18; 463/20

(58) Field of Classification Search .................... 463/17
See application file for complete search history.

(56) References Cited

U.S. PATENT DOCUMENTS

| | | | | |
|---|---|---|---|---|
| 5,050,880 | A * | 9/1991 | Sloan | 273/144 B |
| 5,121,920 | A * | 6/1992 | Laezzo et al. | 273/144 B |
| 5,265,877 | A * | 11/1993 | Boylan et al. | 273/139 |
| 5,280,909 | A | 1/1994 | Tracy | |
| 5,360,214 | A * | 11/1994 | Harmen | 273/144 B |
| 5,380,007 | A * | 1/1995 | Travis et al. | 463/18 |
| 5,401,024 | A * | 3/1995 | Simunek | 463/18 |
| 5,651,735 | A * | 7/1997 | Baba | 463/18 |
| 5,845,903 | A * | 12/1998 | Sloan | 273/144 R |
| 5,909,875 | A * | 6/1999 | Weingardt | 273/269 |
| 6,270,407 | B1 * | 8/2001 | Dodge | 463/18 |
| 6,419,226 | B2 * | 7/2002 | Krise et al. | 273/121 A |
| 6,450,884 | B1 * | 9/2002 | Seelig et al. | 463/17 |
| 6,533,660 | B2 * | 3/2003 | Seelig et al. | 463/17 |
| 6,582,307 | B2 * | 6/2003 | Webb | 463/22 |
| 6,902,479 | B1 * | 6/2005 | D'Avanzo | 463/18 |
| 6,939,225 | B2 * | 9/2005 | Kaminkow | 463/16 |
| 7,059,603 | B1 * | 6/2006 | D'Avanzo | 273/292 |

(Continued)

FOREIGN PATENT DOCUMENTS

| | | |
|---|---|---|
| WO | WO 94/03873 | 2/1994 |

(Continued)

OTHER PUBLICATIONS

Interntational Search Report, dated Nov. 10, 1997.

*Primary Examiner*—John M. Hotaling, II
*Assistant Examiner*—Paul A. D'Agostino
(74) *Attorney, Agent, or Firm*—Nixon Peabody LLP

(57) ABSTRACT

System and method for conducting a slot-keno wagering game. A plurality of objects, some of which bear one of a plurality of symbols are provided. The symbols on the plurality of objects are initially hidden from a player. Each of a plurality of stations is associated with one of the plurality of symbols and each of the plurality of stations receives the objects bearing the associated symbols. A wager input is received from the player for a selected one of the plurality of stations. After receiving the wager input, the objects to be revealed are randomly selected. The symbols are revealed and the objects bearing the revealed symbols are moved to the stations associated with the symbols on the revealed objects. The player is provided with a first award in response to a predetermined number of the revealed objects appearing in the selected one of the plurality of stations.

20 Claims, 7 Drawing Sheets

U.S. PATENT DOCUMENTS

| | | | | |
|---|---|---|---|---|
| 7,316,610 | B2 * | 1/2008 | Seelig et al. | 463/17 |
| 2005/0014555 | A1 * | 1/2005 | Seelig et al. | 463/20 |
| 2005/0075157 | A1 * | 4/2005 | Seelig et al. | 463/16 |
| 2005/0098944 | A1 * | 5/2005 | Brandstetter | 273/144 A |
| 2006/0163806 | A1 * | 7/2006 | Toyoda | 273/142 R |
| 2008/0032761 | A1 * | 2/2008 | Seelig et al. | 463/16 |

FOREIGN PATENT DOCUMENTS

| | | |
|---|---|---|
| WO | WO 98/20949 | 5/1998 |

* cited by examiner

SLOT-KENO VIDEO GAMING MACHINE

FIELD OF THE INVENTION

The present invention relates generally to gaming terminals and, more particularly, to a method and system of conducting a slot-keno wagering game.

BACKGROUND OF THE INVENTION

Gaming terminals, such as slot machines, video poker machines, and the like, have been a cornerstone of the gaming industry for several years. Generally, the popularity of such terminals among players depends on the perceived likelihood of winning money at the terminal and the intrinsic entertainment value of the terminal relative to other available gaming options. Where the available gaming options include a number of competing terminals and the expectation of winning each terminal is roughly the same (or believed to be the same), players are most likely to be attracted to the more entertaining and exciting of the terminals.

Consequently, gaming terminal operators strive to employ the most entertaining and exciting terminals available because such terminals attract frequent play and, hence, increase profitability for the operators. Thus, in the highly competitive gaming terminal industry, there is a continuing need to develop new types of games, or improvements to existing games, that will enhance the entertainment value and excitement associated with the games.

Traditional gaming machines use mechanical slot reels or video depictions of such reels to display games and outcomes to players. Further, many traditional gaming machines use simulations of standard casino games such as cards, dice, bingo and the like to attract players. These traditional machines may become repetitive over time, and it is believed that more innovative displays and gameplay features will find success by offering players an interesting and exciting alternative to traditional games. Accordingly, in the competitive gaming machine industry, there is a continuing need for gaming machine manufacturers to produce new types of games, or enhancements to existing games, which will attract frequent play by enhancing the entertainment value and excitement associated with the game. In particular, there is a need for engaging and entertaining games that can hold a player's interest more than existing games. The present invention is directed to satisfying this need.

SUMMARY OF THE INVENTION

A system and method are disclosed for conducting a slot-keno wagering game. Wager inputs are provided to permit a player to enter wagers on one or more selected symbols from a plurality of symbols. Some of a plurality of objects are associated with one symbol of the plurality of symbols. Upon initiation of the game, the symbols associated with each of the objects are revealed and the player earns credits based upon the accumulation of objects associated with the selected symbols.

In general, in one aspect, the invention is directed to a method of conducting a wagering game. The method includes providing a plurality of objects, at least some of which bear one of a plurality of symbols and which symbols are initially hidden from a player. The method also includes providing a plurality of stations, each of which is associated with one of the symbols. Each of the plurality of stations are for receiving the objects bearing the associated symbols. The method further includes receiving a wager input from the player for a selected one of the plurality of stations. After receiving the wager input, objects are randomly selected to be revealed. The symbols on the objects are revealed and moved to the stations associated with the symbols on the revealed objects. The player is provided with a first award in response to a predetermined number of the revealed objects appearing in selected one of the plurality of stations.

In general, in yet another aspect, the invention is directed to a gaming terminal having at least one display for displaying a plurality of stations, each station associated with one of a plurality of symbols. The display selectively displays a plurality of objects, some of the objects being associated with one of the symbols. The gaming terminal further includes a wager input device for receiving wagers from a player and a symbol selection device for allowing the player to place a wager on one or more of the symbols. The gaming terminal further includes a controller coupled to the at least one display, the wager input device and the symbol selection device. The controller is operative to cause the at least one display to display randomly generated ones of the objects and reveal the symbols borne by the objects. The controller also causes the at least one display to display the revealed objects at the stations associated with the symbols on the revealed objects. The controller also causes a first award to be provided to the player in response to a predetermined number of the revealed objects appearing in the stations associated with each of the player-selected symbols.

In accordance with yet another embodiment of the present invention, a method of playing a wagering game is provided. The method includes providing a plurality of objects, such that some of the objects bear one of a plurality of symbols. The symbols are initially hidden from a player. At least two stations are provided and each of the two stations are associated with one of the plurality of symbols. Each of the stations receive the objects bearing the associated symbols. A first wager input is received from the player for a first selected one of the plurality of symbols. After the wager is received, the symbols on the objects are revealed. A player is provided with an award in response to the revealed objects bearing the selected ones of the plurality of symbols.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
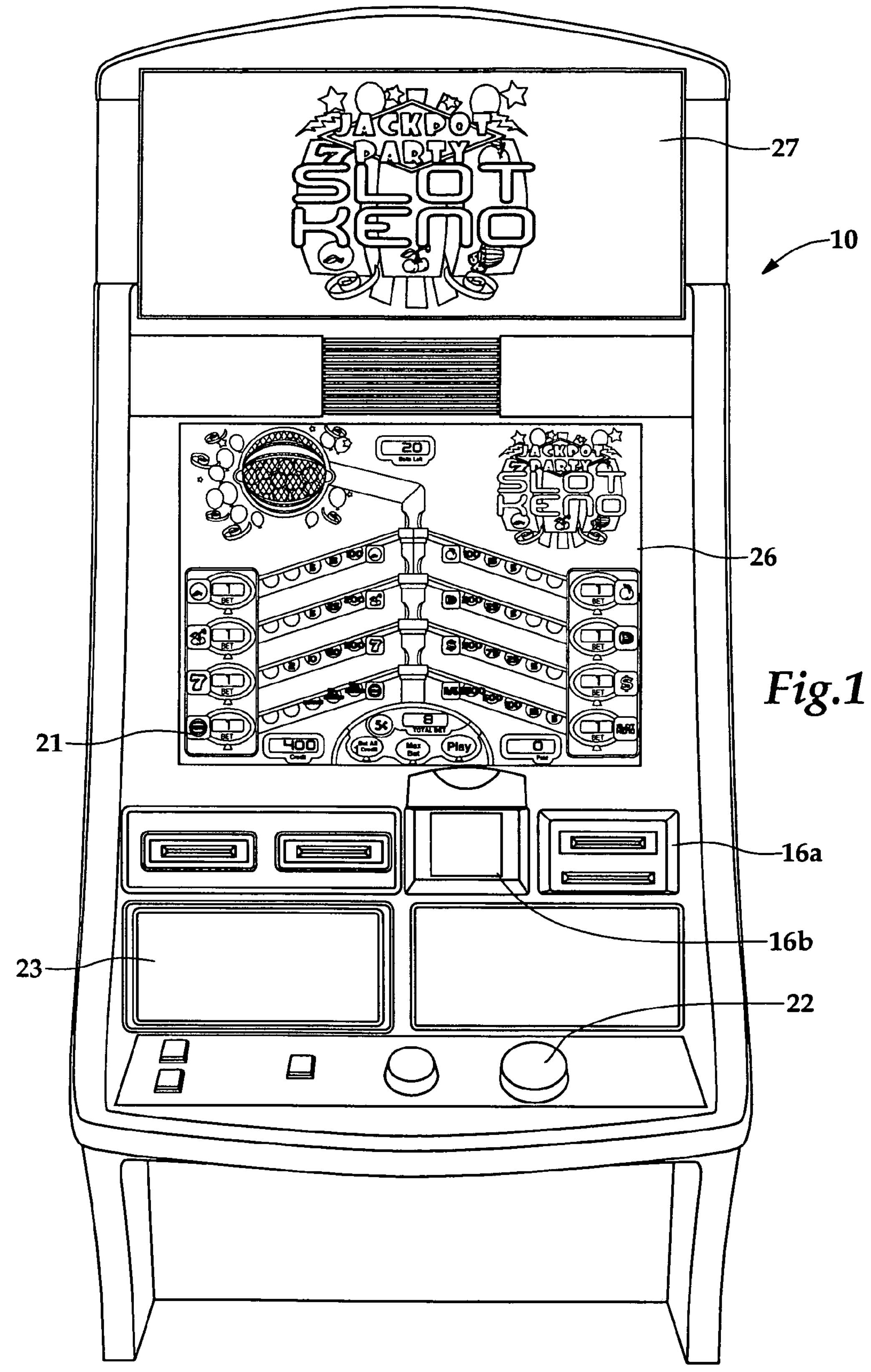
FIG. 1 illustrates a perspective view of a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of an exemplary gaming terminal 10 according to embodiments of the invention. The gaming terminal 10 may be operated as a stand-alone terminal, or it may be connected to a network of gaming terminals. Further, the gaming terminal 10 may have varying structures and methods of operation. In the example shown, the gaming terminal 10 is a video slot-keno machine.

As shown, the gaming terminal 10 has a number of typical gaming terminal components, including input devices, such as a wager acceptors 16*a* and 16*b*, and push buttons 22. In some embodiments, a player-identification card reader 24 may also be present, although such a player-identification card reader 24 is not necessary to the practice of the present invention. For outputs, the gaming terminal 10 includes a main display 26 for displaying information about the basic wagering game and a secondary display 27 for displaying information about the bonus wagering game. While these typical components found in the gaming terminal 10 are described below, it should be understood that numerous other elements may exist and may be used in any number of combinations to create various forms of a gaming terminal.

The wager acceptors 16*a* and 16*b* may be provided in many forms, including a card wager acceptor 16*a* and a cash wager acceptor 16*b*. The cash wager acceptor 16*b* may include a coin slot acceptor or a note acceptor to input value to the gaming terminal 10. The card wager acceptor 16*a* may include a card-reading device for receiving a stored value card and reading a recorded monetary value associated with the card. The card wager acceptor 16*a* may also receive a card that authorizes a transfer of money from a player's credit or banking account to the gaming terminal 10.

The player-identification card reader 24, if present, is designed to read an identification card and extract information therefrom regarding the player's identity. The identification may then be used by casinos for rewarding certain players with complimentary services or special offers. For example, a player may be enrolled in the gaming establishment's players' club and may be awarded certain complimentary services as that player collects points in his or her player-tracking account. When the player inserts his or her card into the player-identification card reader 24, the casino's computers can register that player's wagering at the gaming terminal 10.

The push buttons 22, which may be mechanical push buttons, allow players to select various options with respect to the games played on the gaming terminal 10. The gaming terminal 10 may also include soft buttons on a touch screen 21 located over the main display 26 that serve similar functions.

A payout mechanism 23 is also provided to deliver awards to a player. Such awards may be in the form of cash, tokens, magnetic cards or the like. Thus, payout mechanism 23 may be any of a number of known types of delivery mechanisms for such awards.

The main display 26 displays the outcome of the slot keno game and may take a variety of forms. For example, the main display 26 may be a cathode ray tube (CRT), a liquid crystal display (LCD), a plasma display, or any other type of display that is suitable for simulating a slot-keno game. The secondary display 27, which may also be a CRT, LCD, plasma display, or other type of suitable display, displays a secondary or bonus game that is often played on the gaming terminal 10 in addition to the slot keno game.

Figure 2:
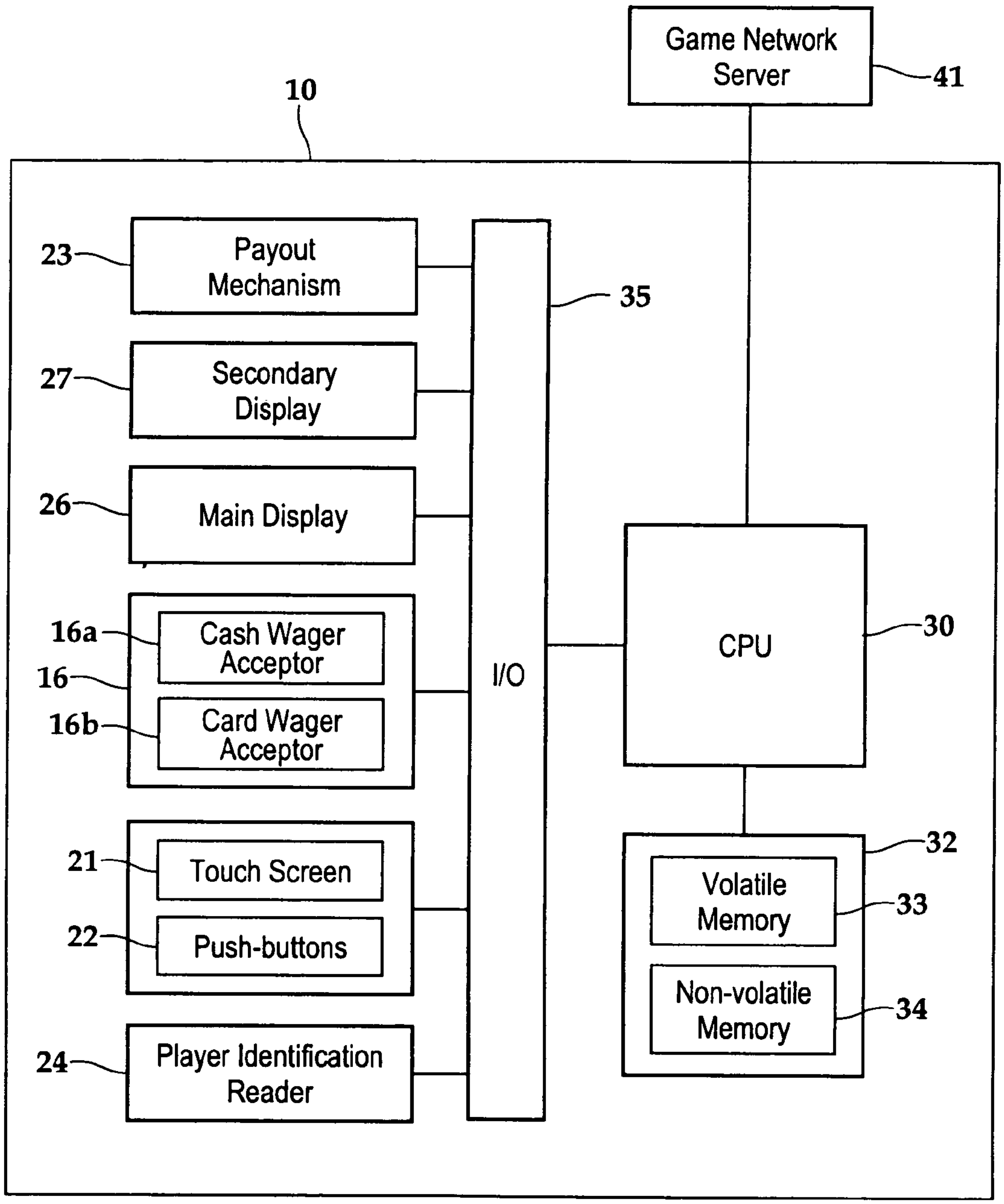
FIG. 2 illustrates a block diagram of the gaming terminal of FIG. 1.

FIG. 2 shows the various components of the gaming terminal 10 in block diagram form. As can be seen, the components of the gaming terminal 10 are controlled by a central processing unit (CPU) 30, such as a microprocessor or microcontroller. The CPU 30 executes one or more programs that randomly selects the outcomes for the gaming terminal 10 and controls the overall operation of the gaming terminal 10. The gaming terminal 10 also includes a storage unit 32 that includes a volatile memory 33 (e.g., a random-access memory (RAM)) and a non-volatile memory 34 (e.g., hard drive, optical drive, an EEPROM). It should be appreciated that the CPU 30 may include one or more microprocessors. Similarly, the storage unit 32 may include multiple volatile memories and non-volatile memories.

Communication between the components of the gaming terminal 10 and the CPU 30 occur through input/output (I/O) circuits 35. As such, the CPU 30 also controls and receives inputs from the various components of the gaming terminal 10.

The gaming terminal 10 is frequently operated as part of a wagering game control network 40 (not shown) that includes several gaming terminals. An example of such a wagering game control network 40 is described in U.S. Patent Application No. 60/502,762, filed on Sep. 12, 2003, and entitled "Restricted Access Progressive Game For A Gaming Terminal," which is commonly owned and incorporated herein by reference in its entirety. The gaming terminal 10 often has multiple ports, each port dedicated to providing data to a specific host computer system that performs a specific function (e.g., accounting, player-tracking, or a progressive game control system, etc). These ports may take the form of one or more custom interface boards mounted in the gaming terminal 10. The ports may also take the form of, for example, network interface cards designed to establish an Ethernet connection from the gaming terminal 10 to the wagering game control network 40.

In some embodiments, the wagering game control network 40 may include a server 41 that controls one or more functions of the gaming terminal 10. The server 41 may be any computer capable of executing programs for controlling slot machines and other types of gaming terminals. In such embodiments, the gaming terminal 10 may be a simple input/output terminal with regard to the functions controlled by the server 41. For example, instead of the random selection being performed by the CPU 30, the random selection of outcomes for the basic game and the bonus game may be functions performed by the server 41 and subsequently provided to the gaming terminal 10. Functions that are not provided by the server 41, such as control of the local lights, sounds, and displays of the gaming terminal 10, are handled by the local CPU 30.

Figure 3:
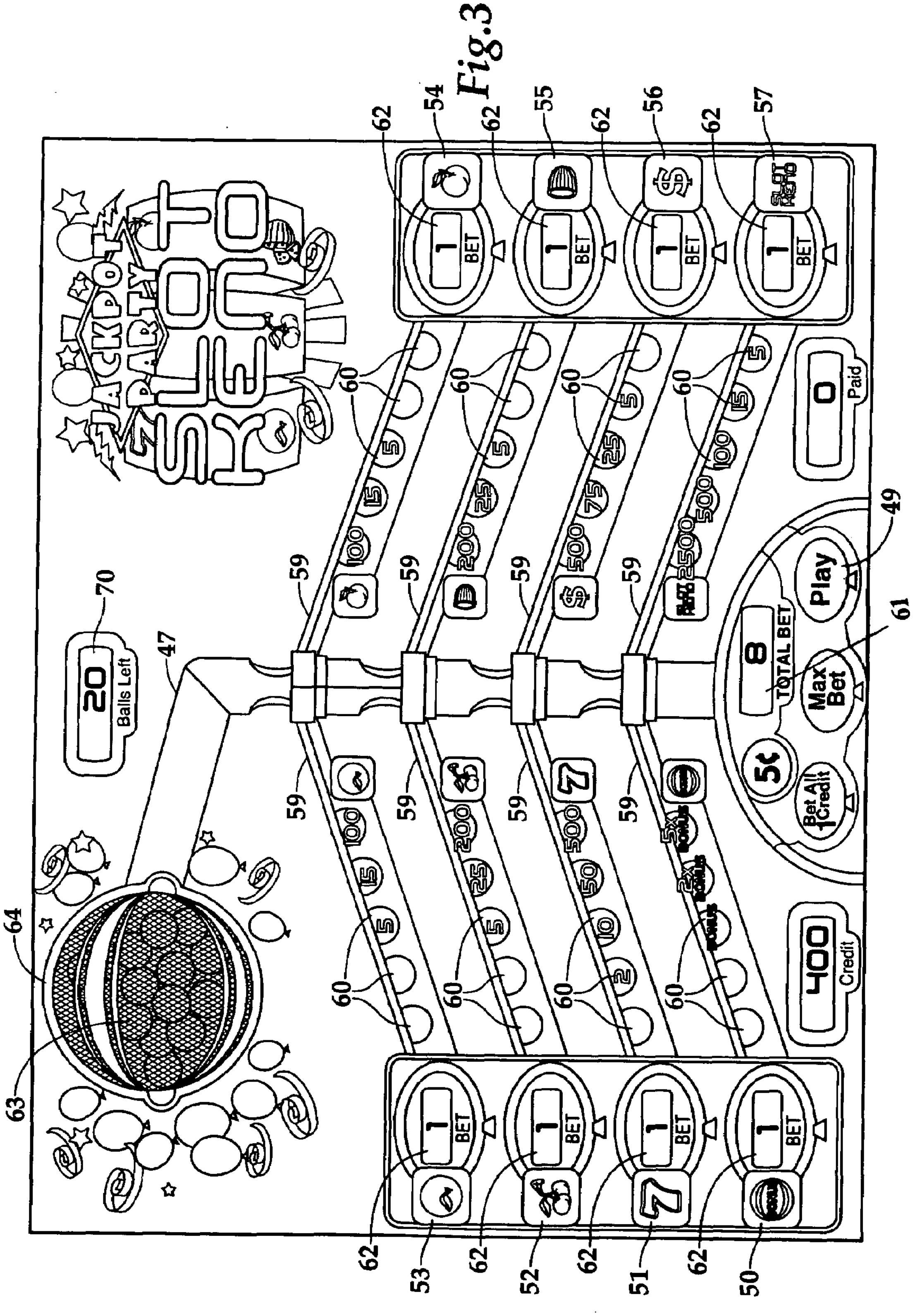
FIG. 3 illustrates a main display of the gaming terminal of FIG. 1.

FIG. 3 illustrates an embodiment of the main display 26 of the gaming terminal in more detail. As seen in FIG. 3, the main display 26 includes a plurality, eight in this instance, of stations 50, 51, 52, 53, 54, 55, 56, and 57, each of which has an associated symbol 58. For example, the numeral "7" is the symbol associated with station 51 and the icon of an "apple" is the symbol associated with station 54. Each of stations 50 through 57 includes an arm 59, each of which contain one or more slots 60. Some or all of the slots 60 have associated awards. For example, the first two slots of station 53, which is associated with an "orange" symbol, have no associated awards, while the third, fourth and fifth slots of station 53 have associated awards of 5, 15, and 100, respectively. The slots 60 on each arm 59 are filled progressively. Thus, to win an award of 5 credits on station 53, there must be three objects associated with the "orange" symbol. In contrast, there is no such threshold minimum number of objects needed to win an award for objects associated with the "slot-keno logo" station 57. That is, the first object associated with the "slot-keno" symbol will be placed into the first slot on station 57, which earns five credits. The threshold minimum number of objects required to earn an award at a given station is indicated by "X" herein. It will be understood that X may be greater than or equal to one and may vary from station to station. Each of stations 50 through 57 further includes a wager counter 62, which displays the wager input made by a player for the associated symbol. Main display 26 further includes a total wager counter 61, which shows the total of all wager inputs made by a player. A plurality of objects 63, some of which have an associated symbol, are randomly generated by the CPU 30. FIG. 3 illustrates the main display prior to the start of the slot-keno game and the symbols associated with the objects 63 are not revealed. As shown in FIG. 3, the objects 63 are embodied as balls in a hopper 64. The main display 26 shown in FIG. 3 illustrates a game in which a player has entered a wager of one credit on each of stations 50 through 57.

As further seen in FIG. 3, a player begins by entering wager inputs on one or more of the stations 50-57. Such wager inputs may be made using either or both of the push buttons 22 or touch screen buttons 21. After the player has entered the desired wagers, the player may initiate the game by depressing a play button. As shown in FIG. 3, the play button 49 is a touch screen button.

The symbols associated with the objects and stations may take any form, including numbers, numerals, icons, pictures, logos, colors, words, and phrases. Such symbols may further include, for example, those symbols typically used on the reels of a slot machine. Alternatively, non-traditional symbols may include, for example, illustrations of animals or playing cards. In some embodiments, a bonus symbol is included in the possible symbols, and its occurrence may trigger one or more bonus games.

Figure 4:
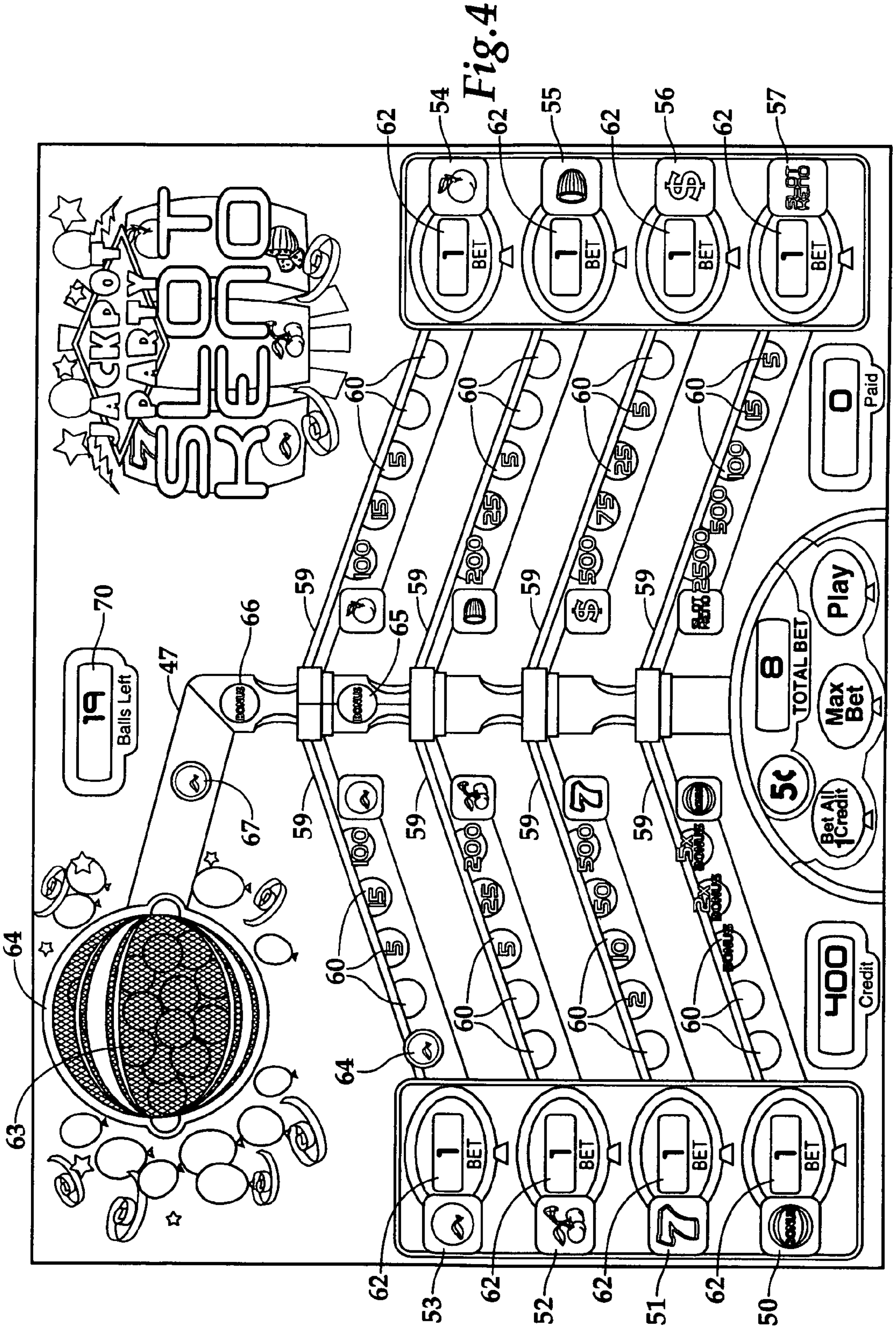
FIG. 4 illustrates the slot-keno game being conducted on the main display of FIG. 3.

FIG. 4 illustrates the main display while the slot-keno game is being conducted. Upon initiation of the game, the symbols borne by plurality of objects 63 are randomly revealed. To maintain the excitement of the game, the symbols associated with the plurality of objects 63 may be revealed one at a time. As depicted in FIG. 4, the plurality of objects 63 includes four objects 64-67. The symbols associated with each of the objects 64-67 are revealed after passing from the hopper 64 into a chute 47. As can be seen, both of the objects 65 and 66 bear the word "bonus" while the symbol borne by the object 67 is an "orange." As can be further seen, the object 64, bearing an "orange" symbol, has already passed into the first slot of station 53. The object 67 will then pass into the second slot of station 53. As can be seen in FIG. 4, main display 26 may also include an object counter 70. The object counter 70 may indicate the number of objects for which the associated symbol has not been revealed or the number of objects which have not yet been placed in the appropriate slot. The object counter 70 serves to provide continued excitement as the game proceeds. As can be seen in FIG. 3, the object counter 70 indicates that the game may begin, for example, with a total of twenty objects. The number of objects to be revealed may vary and may be customized to maximize player appeal and play time.

Figure 5:
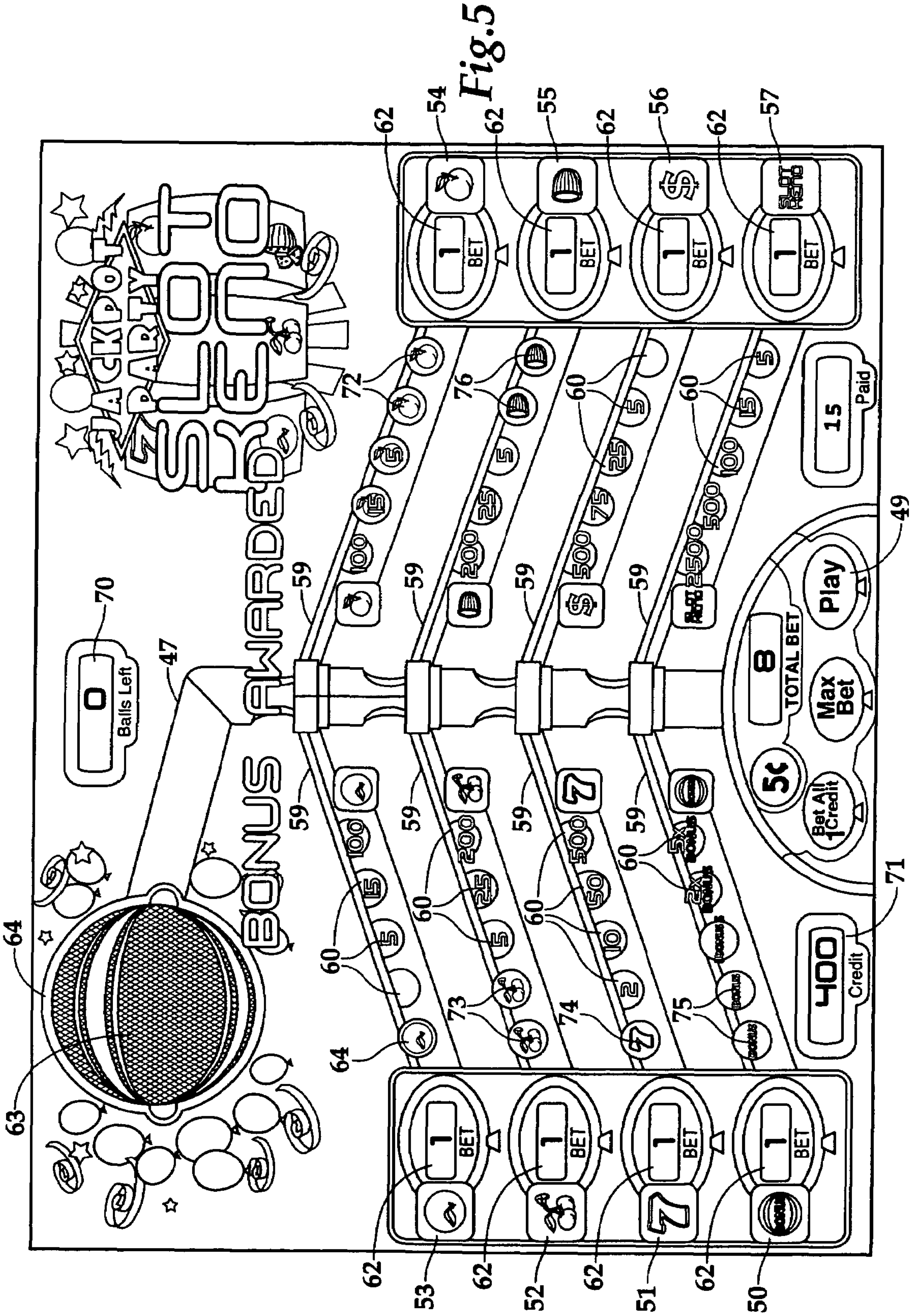
FIG. 5 illustrates the conclusion of the slot-keno game being conducted on the main display and a bonus game being triggered on the main display.

FIG. 5 illustrates the main display 26 upon conclusion of the slot-keno game. In the embodiment shown in FIG. 5, one object had an associated "orange" symbol, two objects had an associated "cherry" symbol, one object had an associated "7" symbol, three objects had an associated "bonus" symbol, four objects had an associated "apple" symbol, two objects had an associated "watermelon" symbol, and no objects were associated with the logo "slot-keno" and the "$" (dollar sign) symbols. That is, as illustrated in FIGS. 3-5, thirteen of twenty objects had associated symbols. Thus, seven of the objects had no symbol. Referring still to FIG. 5, the total credit paid to the player is indicated in outcome indicator 71, fifteen credits for the four "apple" objects.

The main display 26 shown in FIG. 5 also illustrates an embodiment in which a bonus game is earned. Referring to FIG. 3, it is seen on the station 53 that three objects associated with the "bonus" symbol are required to win a bonus game. Because three objects were associated with the "bonus" symbol, the player is awarded a bonus game. A "bonus awarded" statement may be displayed on main display 26. It will be understood that the number of bonus symbols required to earn a bonus game may vary and may be set at any predetermined number "Y."

Figure 6:
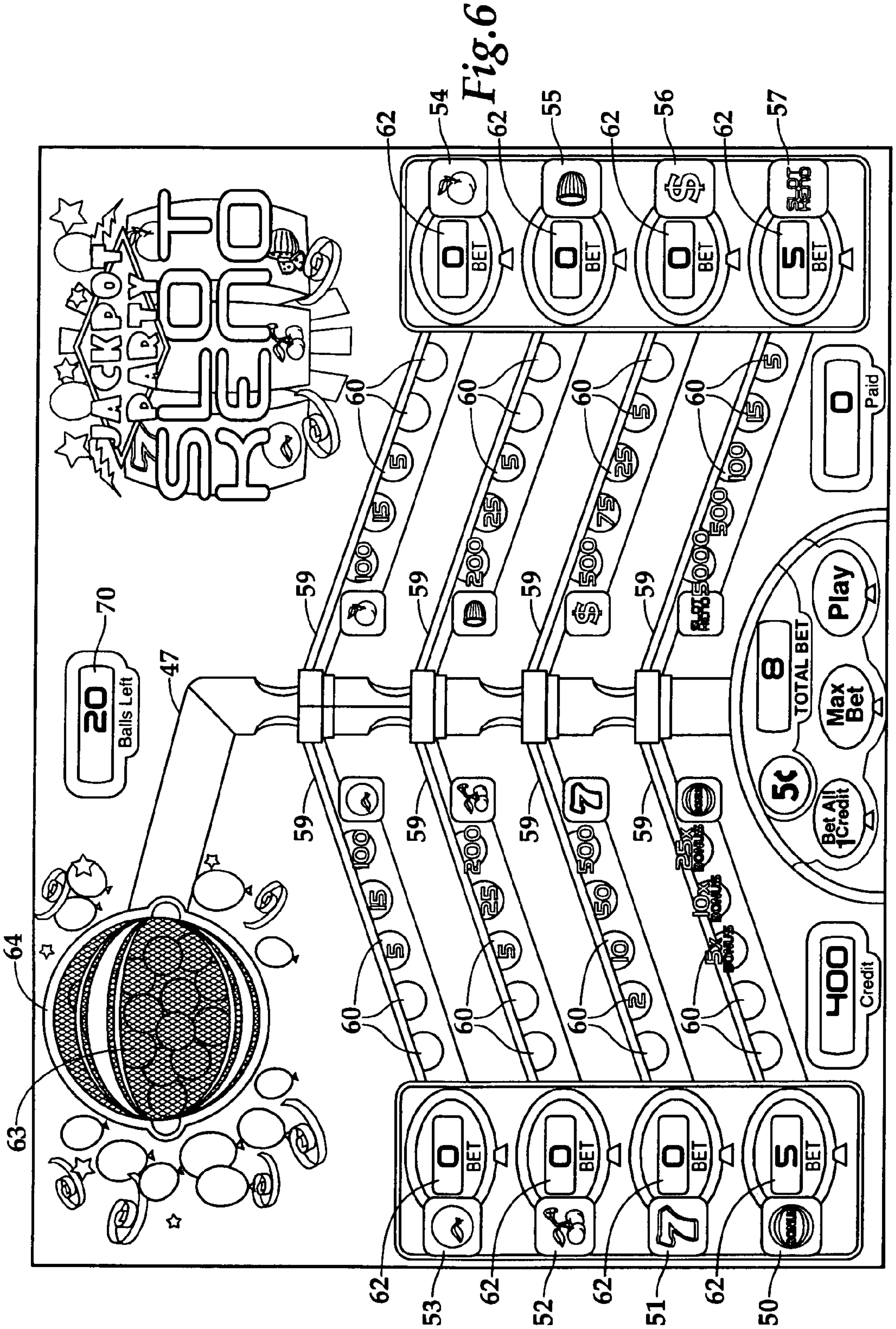
FIG. 6 illustrates an alternative embodiment of the main display.

FIG. 6 illustrates a main display in an alternative embodiment of the invention. As can be seen in FIG. 6, a player may enter different wager amounts on different symbols and may choose to make no wager on some symbols. In the main display 26 shown in FIG. 6, the player has placed wagers of five credits on each of the stations associated with the "bonus" and "slot-keno logo" stations and has chosen to not place any wager on the remaining stations. The amount of the wager functions as a multiplier to the amount of award. That is, if three objects have the "slot-keno logo" symbol, the player would be awarded five times the normal award of 500 credits for a total of 2,500 credits. In some embodiments of the invention, the amount wagered on a bonus station may act as a multiplier to the number of bonus games earned. Thus, as shown in FIG. 6, if three objects having the bonus symbol are revealed, then the player wins five bonus games.

In some embodiments of the invention, those stations on which the player has made a wager may be highlighted. In other embodiments, those stations on which the player has not made a wager may be obscured by, for example, being grayed out.

Figure 7:
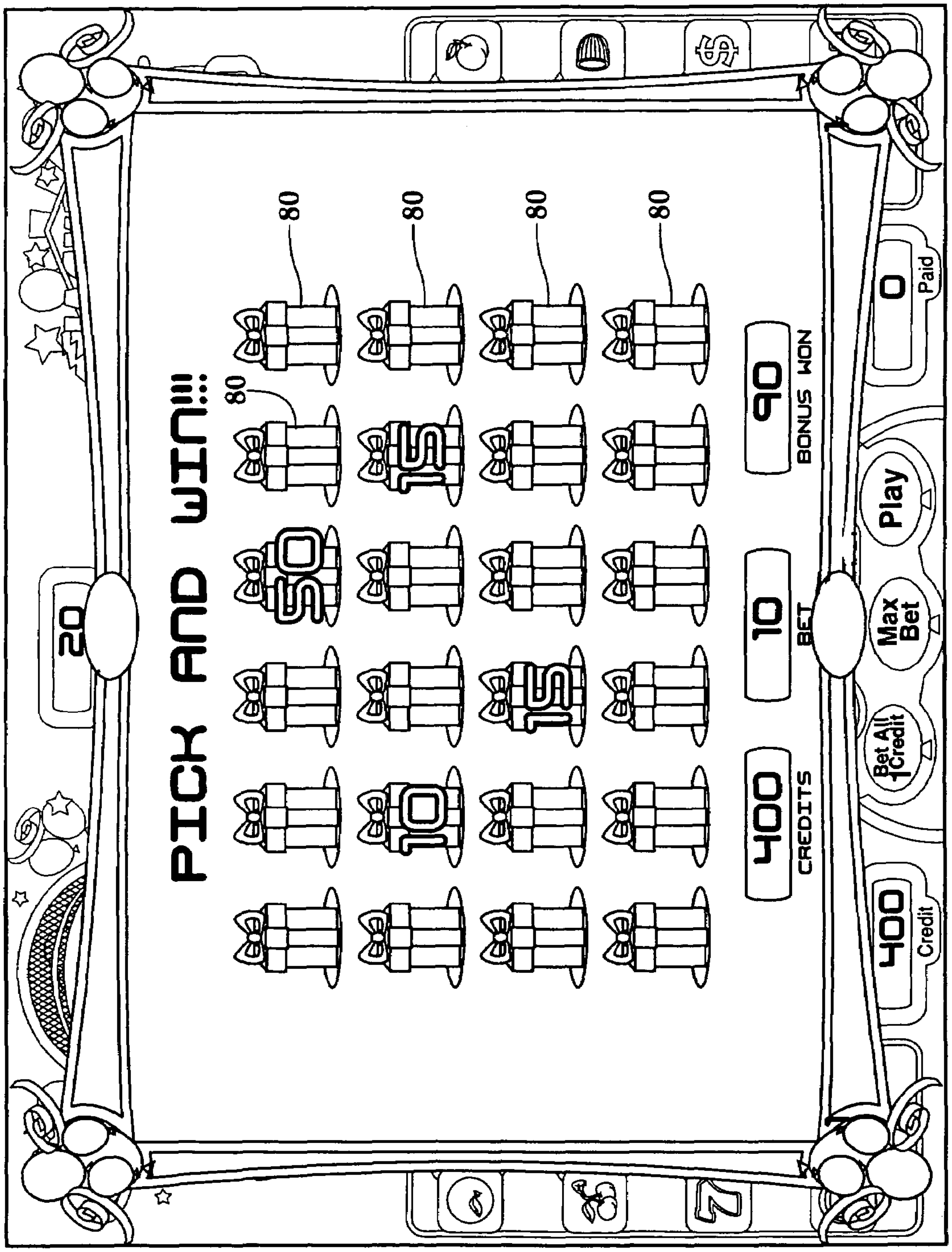
FIG. 7 illustrates a bonus game being conducted on the main display.

A bonus game may be played on either the main display 26 or a secondary display 27. As shown in FIG. 7, a bonus game image is laid over the slot-keno game on the main display 26. The bonus game may be any of a number of known bonus games, including for example, that described in U.S. Pat. No. 6,645,074, which is commonly owned and incorporated herein by reference. In some embodiments of the invention, the bonus game includes an array of player selectable elements 80. As depicted in FIG. 7, the player selectable elements are wrapped presents. The player selects elements 80 and accumulates randomly assigned bonus points associated with the selected elements. One or more elements may have associated with it a bonus-ending event. Upon selection of a bonus-ending element, the bonus game is terminated and the player may be returned to the slot-keno game. The bonus game may be played immediately upon earning a bonus game thereby interrupting the slot-keno game. Alternatively, if a bonus game is earned, it may be played after the slot-keno game is finished.

It will be understood that many of the aspects of the gaming machine and method described above may be varied to optimize player enjoyment and/or operator profit. For example, although FIGS. 3-7 illustrate eight stations, the number of stations may be increased or decreased, so long as the game includes at least two stations. Similarly, the number of slots at each station is shown to be five in each of FIGS. 3-7. However, the number of slots may be increased or decreased and may vary from station to station. Moreover, the objects, while depicted as animated balls in FIGS. 3-7, may be of any shape or type of object which may bear a symbol. Similarly, although the wager input has been described as a multiplier of the award in connection with the description of FIG. 6, it will be understood that the award may be alternatively multiplied by a number which is a function of the wager amount, with the function being predetermined. For example, the award multiplier may be equal to ((wager amount×2)−1). The player-selectable objects may include a "multiplier" symbol. As such if the player selects the "multiplier" symbols and an object is revealed, then any award that is obtained due to the accumulation of objects at other stations is multiplied by the multiplier value.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of playing a wagering game, comprising:

providing a plurality of objects, at least some of said plurality of objects bearing one of a plurality of symbols, said symbols on said plurality of objects being initially hidden from a player;

providing a plurality of stations, each of said plurality of stations being associated with a single one of said plurality of symbols, each of said plurality of stations labeled with the single one of said plurality of symbols for receiving only said objects bearing said associated symbol of the station;

receiving a wager input from the player for a selected one of said plurality of stations;

after receiving said wager input, randomly selecting said objects to be revealed;

revealing said symbols on said objects and moving said revealed objects to said stations associated with said symbols on said revealed objects; and providing the player with a first award in response to a predetermined number of said revealed objects appearing in said selected one of said plurality of stations.

2. The method of claim 1, further comprising:

providing a player with a second award in response to more than said predetermined number of revealed objects appearing in said selected one of said plurality of stations.

3. The method of claim 1 further comprising providing additional awards for each additional revealed object greater than said predetermined number.

4. The method of claim 1 wherein said first award is increased by a multiplier determined by said wager input for said selected one of said plurality of stations.

5. The method of claim 1 wherein said plurality of symbols are selected from the group of numerals, icons and logos.

6. The method of claim 1, further comprising:

providing a station associated with a bonus symbol; and starting a bonus game in response to a predetermined number of revealed objects appearing in said station associated with said bonus symbol.

7. The method of claim 2, wherein said second award is greater than said first award.

8. The method of claim 3 wherein said additional award increases for each additional revealed object greater than said predetermined number.

9. The method of claim 6 wherein said bonus game includes an array of player-selectable elements.

10. A gaming terminal, comprising:

at least one display for displaying a plurality of stations, each of said stations being associated with a single one of a plurality of symbols and labeled with the single one of said plurality of symbols, said display for selectively displaying a plurality of objects, at least some of each of said objects being associated with one of said symbols;

a wager-input device for receiving wagers from a player;

a symbol-selection device for allowing the player to place a wager on one or more of said symbols; and a controller coupled to said at least one display, said wager-input device, and said symbol-selection device, said controller operative to:

(i) cause said at least one display to display randomly generated objects and reveal the symbols borne by the objects;

(ii) cause said at least one display to display said revealed objects only at said stations associated with said symbols on said revealed objects; and (iii) provide a first award to the player in response to a predetermined number of said revealed objects appearing in said stations associated with each of said player-selected symbols.

11. The gaming terminal of claim 10 wherein said controller performs a random selection of said plurality of objects.

12. The gaming terminal of claim 10 wherein said wager-input device permits said player to input different wager amounts on different ones of said symbols.

13. The gaming terminal of claim 10 wherein said plurality of objects are depicted as a plurality of animated balls and wherein said plurality of balls are held in a wire cage hopper.

14. The gaming terminal of claim 10, further comprising an object counter on said at least one display.

15. The gaming terminal of claim 11 wherein one of said stations is associated with a bonus symbol and said controller is further operative to initiate a bonus game in response to a predetermined number of said revealed objects appearing in said station associated with said bonus symbol.

16. The gaming terminal of claim 12, further comprising a bonus awarded indicator on said display.

17. The gaming terminal of claim 13 wherein said plurality of stations are connected to said hopper by a chute.

18. A method of playing a wagering game, comprising:

providing a plurality of objects, some of said plurality of objects bearing one of a plurality of symbols, said symbols on said plurality of objects being initially hidden from a player;

providing at least two stations, each of said at least two stations is associated with a single one of said plurality of symbols, each of said at least two stations labeled with one of said plurality of symbols for receiving said objects bearing said associated symbol of the station;

receiving a first wager input from the player for a first selected one of said plurality of symbols;

after said receiving, revealing said symbols on said objects; and providing a player with an award in response to said revealed objects bearing said selected ones of said plurality of symbols.

19. The method of claim 18, further comprising receiving a second wager input from a player for a second selected one of said plurality of symbols.

20. The method of claim 19 wherein said second wager is not equal to said first wager.

* * * * *